May 6, 1958 P. R. SCHROEPPEL 2,833,106
SUSPENSION AND CONTROL MEANS FOR ROTARY SIDE DELIVERY RAKE
Filed April 21, 1955 3 Sheets-Sheet 1

INVENTOR:
PAUL R. SCHROEPPEL

BY: Emerson B. Donnell
ATTORNEY

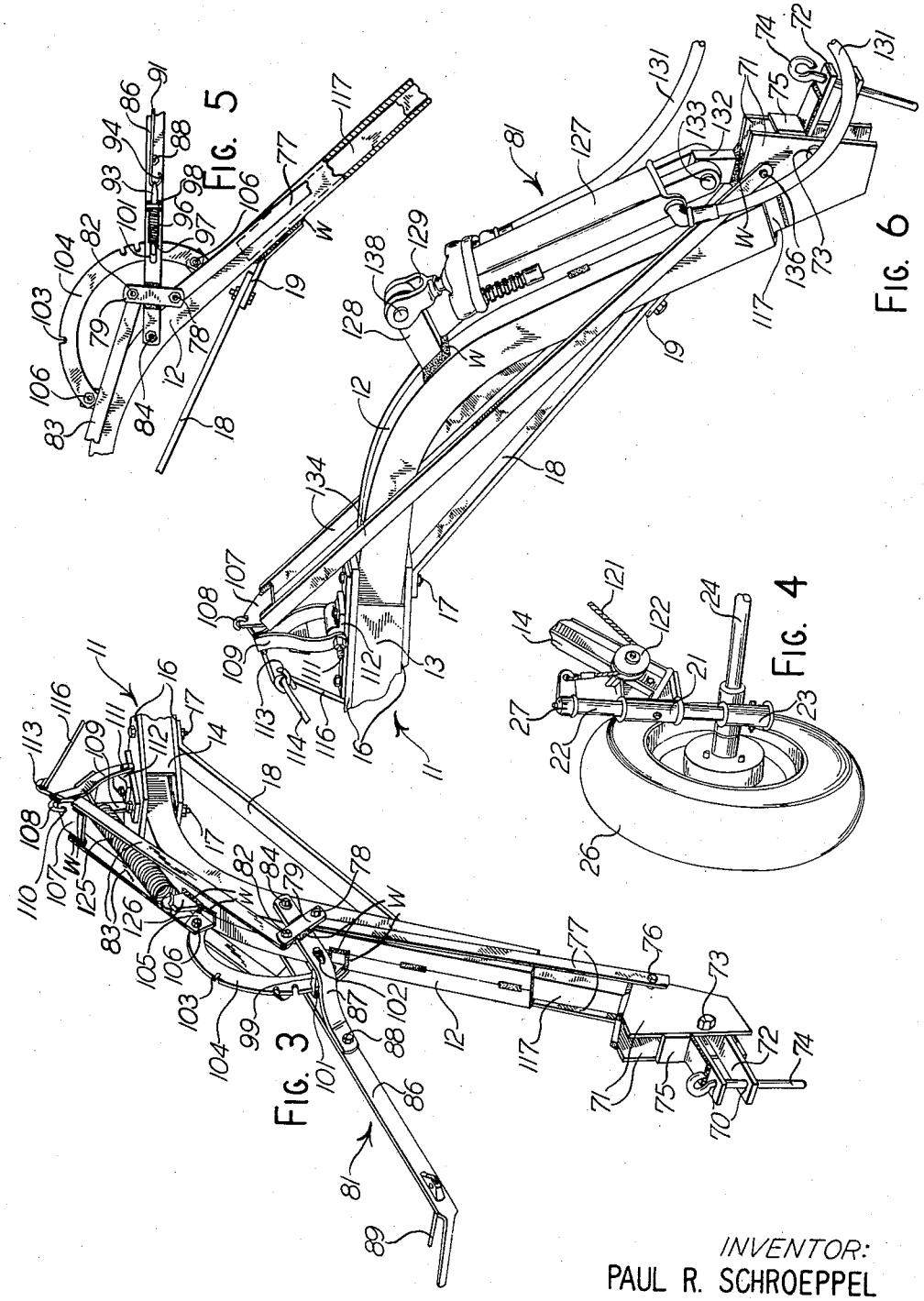

United States Patent Office 2,833,106
Patented May 6, 1958

2,833,106

SUSPENSION AND CONTROL MEANS FOR ROTARY SIDE DELIVERY RAKE

Paul R. Schroeppel, Rockford, Ill., assignor to J. I. Case Company, Racine, Wis., a corporation of Wisconsin Application April 21, 1955, Serial No. 502,835

4 Claims. (Cl. 56—377)

This invention relates to an agricultural rake, and, more particularly, it relates to an agricultural rake which is propelled by a tractor or the like.

An object of this invention is to provide a rake which can be readily and easily raised or lowered to place it in the transport position or the operating position as desired.

Another object is to provide a rake which can be changed from the transport and the operating positions and returned to the exact respective original positions in a minimum of time and effort.

Other objects and advantages will become apparent upon reading the following description in conjunction with the accompanying drawings, wherein, Fig. 1 is a front perspective view of a rake containing a preferred embodiment of this invention.

Fig. 3 is an enlarged perspective view of a fragment of the rake shown in Fig. 1 but with the operating parts in a different position.

Fig. 4 is a reduced perspective view of a fragment of the rake shown in Fig. 2 but with the operating parts in a different position.

Fig. 5 is a side elevational view with parts broken away and shown in section of a fragment of the embodiment shown in Fig. 3 but from the side opposite thereto.

Fig. 6 is a perspective view of another embodiment of a fragment of the embodiment shown in Fig. 1.

Similar reference numerals refer to the same parts throughout the several views and this specification.

Figure 1:
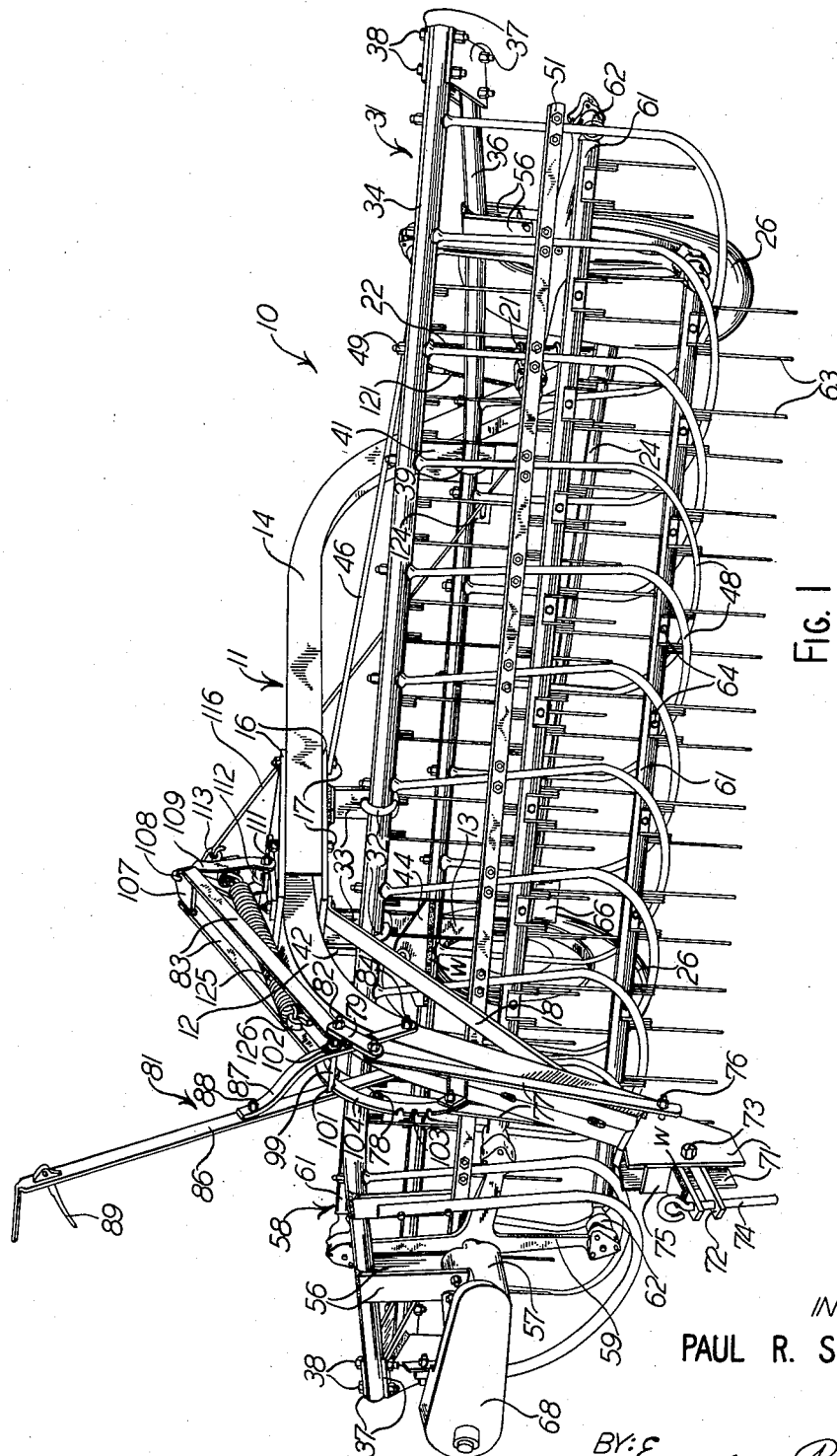
Figure 2:
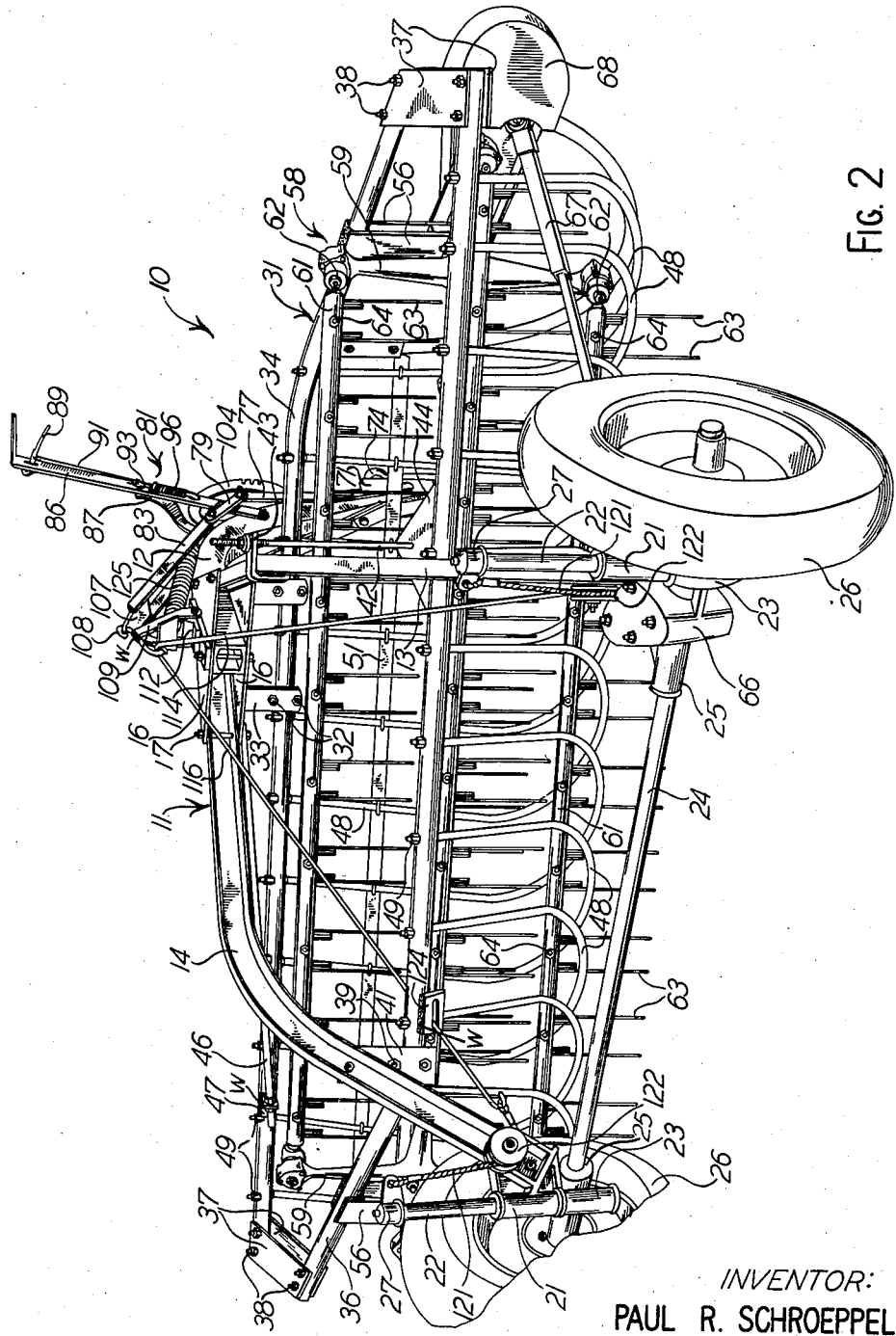
Fig. 2 is a rear perspective view of the rake shown in Fig. 1.

As shown in Fig. 1, this invention is incorporated in what is commonly termed a side delivery rake 10 which is attachable to a tractor (not shown). The rake comprises a main frame 11 which is generally horizontally disposed with a forwardly located depending end 12 and rearwardlly located ends 13 and 14. In the top plan view, the frame 11 forms a Y-shaped member. Figs. 1 and 2 show the manner in which the end section 12 is attached to the sections 13 and 14. In this regard, a pair of attaching plates 16 is secured by means of bolts 17 to the top and bottom sides of the ends of members 12, 13 and 14 to clamp them altogether. To further secure the frame 11, it is preferred that a brace 18 be attached to the bottom of the plate 16 by one of the bolts 17 and to the front portion of the frame end 12 in any conventional manner such as bolting to a bracket 19 which is welded, as indicated at W, to the end 12 as shown in Fig. 5.

The rear ends of the sections 13 and 14 have attached thereto vertically disposed sleeves 21 which slidably receive upright posts or spindles 22 for a purpose hereinafter apparent. The lower ends of the posts or abutments 22 have stops 23 stationarily affixed thereto. Fig. 2 clearly shows the operating position of the rake with the sleeves 21 supported on the stops or bearings 23 and thereby supporting the frame 11 directly on the stops. The latter members have secured thereto horizontal bearings 25 for an axle 24 which extends between them to rotatably mount a pair of wheels 26 on opposite ends of the axle 24. At this time, it should be noticed that the upper ends of the posts 22 terminate in caps 27 which limit the upper sliding movement of the sleeves 21. Thus, the entire rake 10 is mobilized on the wheels 26 as the rake is also supported at a forwardly located tractor hitch described later.

Figs. 1 and 2 further show a reel supporting frame 31 secured underneath the main frame 11 to be at a diagonal angle thereto in the usual manner. The preferred means of attaching the frames together is a pair of clamps 32 attached to plates 33 vertically suspended from the plates 16. The clamps 32 thus receive a horizontally disposed front bar 34 of the frame 31 which also includes a rear bar 36 and together they form a horizontal frame. The bars 34 and 36 are bent toward each other at one end of each with a pair of connecting plates 37 attached to the ends of the bars by bolts 38 to secure the bars together in one frame 31. The rear bar 36 is fastened to the frame 11 by means of a clamp 39 which is maintained by a plate 41 bolted to depend from the frame section 14. A second support point is provided by a threaded rod 42 which is attached by a bracket 43 to the frame section 13 to depend to a plate 44 welded at W to the bar 36. In this manner, the rod 42 is adjustable in its effective length, and that end of the frame 31 can then be raised and lowered slightly with respect to the main frame 11. A final point of connection between frames 11 and 31 is that provided by a tie bar 46 suitably attached between the bolt 17 on the frame section 14 and a bracket 47 welded at W to the front bar 34.

It should be noticed that the frame 31 also has attached thereto a plurality of spaced apart U-shaped stripper rods 48 which are attached between the front bar 34 and the rear bar 36. The shown manner of attaching is by threading each upper end of the rods, which pass through the bars 34 and 36, with nuts 49 engaging the rods to secure them in the assembly. A reenforcing bar 51 is preferably bolted across the front of the rods 48.

Attached to depend from the opposite sides of the frame 31 are plates 56 which support bearings 57 at their lower ends. The bearings 57 support a reel 58 located within the frame 31. Rotatably journaled within each bearing 57 inwardly thereof is a four legged spider member 59 which is disposed for rotation about a horizontal axis. The spiders 59 form a pair and are positioned in vertical planes to be substantially parallel to the angle of the bent ends of the arms 34 and 36. Rotatably attached to each of the four ends of the spiders 59 and therebetween is a horizontally disposed bar 61. Each of the four bars 61 is attached to the spiders by a conventional bearing arrangement as shown at 62. Connected to be spaced along each bar 61 are pairs of spring rake tines 63 which, during operation of the rake, always depend from the bars, as shown, and are attached thereto by bolts 64.

The foregoing description generally is of a conventional side delivery rake, and no further description thereof is deemed to be necessary. It should be understood that a tractor is hitched to the rake to tow the latter during operation thereof. In so doing, the gears in a gear box 66, shown in Fig. 2, are operated in response to the rotation of the rake wheels 26. This in turn rotates the drive shaft 67 which is connected to a drive sprocket and chain located within the cover 68. This drive is transmitted to the spiders 59 to rotate the latter in response to forward movement of the rake. The ground drive mechanism described is conventional and need not, therefore, be further described. In this manner, the reel 58 is rotated to cause the tines 63 to move down to the ground at the rear of the reel and up from the ground at the front of the reel. Mown material is then raked into a roll and deposited at the trailing side edge of the reel 58.

When it is desired to transport the rake to another site without effecting a raking operation, the entire frame 31 and the reel 58 can be raised by the hereinafter described mechanism.

As shown in Fig. 1, the section 12 of the main frame 11 is provided with a hitch comprised of a pair of vertical hitch plates 71 which flank a clevis 72 with the latter being secured to the plates by a removable horizontal bolt 73. To limit the amount of upward pivotal movement of the clevis, it is preferred that a bracket 75 be welded at W to the top of the clevis to abut the edge of the hitch plates. Further, the clevis 72 contains vertically aligned holes 70 which receive a hitch pin 74, as shown. In the usual manner, the pin 74 is removed from the clevis until the tractor draw bar (not shown) is positioned within the clevis and the pin is then replaced to lock the rake 10 to a tractor.

The hitch plates 71 also receive a horizontal pin 76 which passes therethrough to pivotally support a pair of lower links 77 extending along opposite sides of the section 12. The upper ends of the links 77 each receive a bolt 78 which pivotally attaches the links to two other links 79. The latter are welded at W to a lever 81 which forms an actuator, and they extend thereacross to pivotally attach through bolts 82 to still another pair of links 83. At this time, it should be noticed that the lever 81 is pivotally mounted at its lower end onto the section 12 by a bolt 84 which passes therethrough. Further, the lever preferably consists of a straight piece 86 with a second piece 87 attached to it by a bolt 88 to be offset therefrom at the lower end of the lever where the bolt 84 is located. The upper end of the lever 81 is provided with operating handle 89 having a connector rod 91 (Fig. 5) attached to it to extend down to an angled rod 93. Rod 93 receives a hook 94 on the rod 91 to fasten the rods together. A coil spring 96 surrounds the length of the rod 93 adjacent the lever piece 86 and is shouldered at one end by a pin 97 projecting from the rod to abut the spring and the spring is shouldered at the other end by a bracket 98 which is attached to the lever 81 to abut the spring end. Of course, the bracket has an opening which is not shown but which is provided in any well-known manner for slidably receiving the rod 93. With this arrangement, the rod 93 is spring loaded to maintain a downward tension on the handle 89 and normally keep the rod in a downward position.

Fig 1 shows another end 99 of the rod 93 with the end 99 projecting through a slotted opening 101 in the lever 81 to be transverse to the lever. A similar slot 102, in the lever piece 87, receives the end of the rod 93 which has a pin across its end and it is thus slidably secured to the lever. Thus, actuating the handle 89 compresses the spring 96 against the bracket 98 as the rod 93 slides up in the slots 101 and 102. In this operation the rod end 99 is withdrawn from its position in a notch 103 formed in the upper edge of a quadrant 104. The latter is attached to the frame section 12 by two brackets 105 which are welded at W thereto and by bolts 106 engaging the ends of both the semi-circular quadrant and the brackets.

Referring again to the links 83, it will be noticed that the upper ends thereof are preferably welded at W to a block 107. The latter contains a hole 110 wherein a hook 108 is received as also shown in Fig. 6. A central section of the hook 108 is preferably welded at W to the top ends of a pair of pivot fulcrums 109 with the latter being pivotally mounted onto the top one of the attaching plates 16 by a horizontal bolt 111 in a boss 112. As further shown in Figs. 1 and 6, the opposite end of hook 108 contains a second hook 113 which attaches to two tie rods 114 and 116, the members 108, 109 and 113 constituting a bell crank fulcrumed on bolt 111.

Between Figs. 1 and 3, it is shown that the lever 81 is pivotal from the position of Fig. 1 to that of Fig. 3 with the result of lowering the links 77. In so moving, the links 77 actuate the hitch plates 71 downwardly as a hitch plate support arm 117 slides out of the hollow frame section 12. The arm 117 is, therefore, suitably affixed to the hitch plates as the section 12 receives the opposite end of the arm, as shown also in Fig. 5. Therefore, the arm 117 provides a telescoping extension to the section 12 to permit raising the section, and thus raising the front end of the rake, in response to the operation of the lever 81. Such raising action is effected since the hitch plates remain level with the tractor hitch and the section 12 must, therefore, rise when the lever is actuated to the position of Fig. 3. Release of the operating handle 89 will permit the spring 96 to seat the rod 93 in a quadrant notch 103 and thus lock the linkage system in the position selected, as shown in Fig. 3.

Referring again to Figs. 1 and 2, it will be apparent that the tie rods 114 and 116 extend to the rear of the rake to where they are fastened to wire ropes or cables 121. The latter each engage a pulley 122 rotatably attached inwardly of the frame sections 13 and 14 with the opposite ends of the ropes being fastened to the caps 27 on the posts 22. It should, therefore, be apparent that actuation of the lever 81 imparts motion to the tie rods 114 and 116 and, in turn, to the cables 121 which lift upwardly on the pulleys 122 and consequently raise the frame 11 with respect to the wheels. Fig. 4 shows the raised position of the rear of the frame 11 on the post 22. That position corresponds to the position of the front of the frame 11 as shown in Fig. 3. Thus, actuation of the lever 81 causes the frame 11 to be raised from the operating position to the transport position. Of course, the reverse motion of the handle causes the frame to be lowered back to its operating position.

Fig. 2 shows the rods 114 and 116 extending to the rear of the frame 11 with the rod 116 passing under the bar 36 and supported in a slotted bracket 124 welded at W to the bar 36. The rod 114 passes over the bar 36 as the latter is, of course, diagonally disposed and is, therefore, so related to the rods 114 and 116.

With reference to Figs. 1 and 3, it will be seen that a coil spring 125 is attached between a post 126, welded at W onto the section 12, and the bell crank 109. The spring, therefore, exerts a forward force and assists in pulling on the tie rods 114 and 116 to raise the rear end of the frame 11. Of course, when the pawl or rod 93 is engaged in a notch 103 in the quadrant 104, the spring has no effect on the linkage system.

Fig 6 shows another species of the invention wherein it incorporates a different actuator in the form of a hydraulic power cylinder 127 which is used in place of the actuator 81. In this embodiment, the frame section 12 has welded thereto at W a post 128 which pivotally secures a piston connecting rod 129 by a pin 138. The cylinder 127, of course, contains the usual piston to which the rod 129 is connected. Also, hydraulic hoses 131 are attached to the cylinder 127 to reciprocate the piston in the usual manner under control of the operator. It will thus be understood that both actuators 81 and 127 are controlled by the operator from his position on the tractor, as the handle 89 extends to within the reach of the operator and the hoses 131 are attachable to the usual hydraulic pump on the tractor. The lower end of the cylinder is connected, by a pin 133 to a post 132, welded at W to the top of the hitch plates 71. Hydraulic pressure within the cylinder causes the connecting rod 129 to extend out from the cylinder and thereby increase the distance between the posts 128 and 132 to raise the frame section 12 with respect to the hitch on the tractor, as prevously described.

When the frame 12 is thus raised from the hitch plates 71, a pair of links 134, which are attached at one end to the plates by a bolt 136 and at the other end to the hook 108, transmits the hitch plate motion to the tie rods 114 and 116 as the bell crank 109 is pivoted. In this manner, the tie rod movement raises the rear end of the frame 11 simultaneously and correspondingly with the rise of the front end, as previously described.

While a specific embodiment of this invention has been shown and described, it should be obvious that changes can be made in the construction, and the scope of this invention should, therefore, be limited only by the appended claims.

I claim:

1. In a tractor conveyed type of rake, the combination comprising a rake main frame, a vertically movable hitch attached to the front of said frame to be vertically adjustable relative thereto, a horizontally disposed wheel axle, ground wheels mounted on opposite ends of said axle, an upright post mounted on each opposite end of said axle and slidably connected to said frame for vertical movement of the latter with respect to said axle, an actuator mounted on said frame for transmitting a force through said actuator, a connector attached between said actuator and said hitch for vertically moving the latter upon transmitting said force through said actuator, and a second connector attached between said actuator and each of said upright posts and also connected to said frame for transmitting said force through said actuator to said connectors for raising and lowering said rake frame with respect to said wheels.

2. In a tractor conveyed type of rake, the combination comprising a rake main frame, a raking reel rotatably mounted to be horizontally disposed on said frame, a hitch member attached to the front of said frame to be vertically movable relatively thereto, a wheel axle attached to the rear of said frame to be horizontally disposed, ground wheels mounted on opposite ends of said axle, a post vertically mounted on each opposite end of said axle between said wheels and adjustably attached to said frame for vertically movably mounting the latter with respect to said axle, a lever mounted on said frame, a link attached between said lever and said hitch for imparting vertical movement to the latter upon actuation of said link, a bellcrank mounted on said frame behind said lever, a second link attached between said lever and said bellcrank, and a flexible cable connected intermediate said bellcrank and each of said posts and also engaged with a horizontal shoulder on said frame at a horizontal level below the horizontal level of the attachment of said cable with said post when said reel is in the raking position with all arranged for operation of said lever to impart simultaneous corresponding actuation to said links to raise or lower said rake frame with respect to said wheels.

3. In a tractor drawn wheel supported side delivery rake of the type including a generally longitudinally extending arched frame having a downwardly directed front end portion, a raking reel supported beneath the frame and means for rotating the reel, the combination of a tractor hitch slidable on said downwardly directed portion of the frame and guided for up-and-down movement relatively thereto, an actuator mounted on said frame, a connection from said actuator aranged to cause up-and-down movement of said hitch in response to actuation of said actuator, spaced ground engaging supporting wheels mounted for up-and-down movement on the rear of said frame, stop means associated between said wheels and said frame for limiting the upward movement of said wheels on said frame and thereby rigidly supporting the latter on said wheels, and connections from said actuator constituted to cause up-and-down movement of said wheels in synchronism with the movements of said hitch in response to actuation of said actuator, whereby said arched frame and reel will have bodily up-and-down movement relative to said hitch and wheels as a result of actuation of said actuator.

4. In a tractor conveyed type of rake, the combination comprising a rake frame having two spaced apart sections at the rear end thereof, a rake reel rotatably and horizontally disposed on said frame, a tractor connector vertically movably attached to the front end of said rake frame, a horizontally disposed wheel axle, a ground wheel mounted on each end of said axle, a spindle connected to each end of said axle and uprightly disposed thereon, an abutment on the lower end of each said spindle, a sleeve attached to each of said sections of said frame and being disposed in an upright direction and each said sleeve mounted on each said spindle for sliding movement thereon and into supporting contact with each said abutment in the downward movement of each said sleeve, a horizontal shoulder located on each of said sections of said frame below the top level of said spindles and directed downwardly, an actuator mounted on said frame, a first connector attached between said actuator and said tractor connector, a pair of second connectors operatively associated with said first connector and extending rearwardly on said frame, said second connectors each including a section attached to the top of said spindles and each said section also engaging each said horizontal shoulder therebelow for vertically supporting said frame upon operation of said actuator and corresponding operation of said connectors to raise and lower said frame with respect to said wheels.

References Cited in the file of this patent

UNITED STATES PATENTS

| 1,313,880 | Clausen | Aug. 26, 1919 |
| 2,327,308 | Johnston | Aug. 17, 1943 |
| 2,545,723 | Conner | Mar. 20, 1951 |
| 2,597,828 | Spurlin | May 20, 1952 |
| 2,690,622 | Silver et al. | Oct. 5, 1954 |